United States Patent [19]

Gluntz

[11] Patent Number: 5,178,821
[45] Date of Patent: Jan. 12, 1993

[54] STANDBY PASSIVE INJECTION COOLANT WATER SAFETY INJECTION SYSTEM FOR NUCLEAR REACTOR PLANTS

[75] Inventor: Douglas M. Gluntz, San Jose, Calif.

[73] Assignee: General Electric Company, San Jose, Calif.

[21] Appl. No.: 716,023

[22] Filed: Jun. 13, 1991

[51] Int. Cl.⁵ .............................................. G21C 15/18
[52] U.S. Cl. ..................................... 376/282; 376/377
[58] Field of Search .............. 376/282, 283, 298, 352, 376/373, 377

[56] References Cited

U.S. PATENT DOCUMENTS 5,000,907 3/1991 Chevereau et al. ................ 376/282
5,082,620 1/1992 Fennern ............................. 376/373

*Primary Examiner*—Daniel D. Wasil
*Attorney, Agent, or Firm*—Robert R. Schroeder

[57] ABSTRACT

A boiling water nuclear reactor plant is provided with a standby supply of auxiliary coolant water for use in the event of a loss of coolant mishap to provide supplementary coolant water for cooling the fuel core. The supply of standby auxiliary coolant water is maintained within the reactor pressure vessel and is administered by inherently passive means.

14 Claims, 3 Drawing Sheets

5,178,821

STANDBY PASSIVE INJECTION COOLANT WATER SAFETY INJECTION SYSTEM FOR NUCLEAR REACTOR PLANTS

FIELD OF THE INVENTION

This invention relates to water cooled nuclear fission reactors of the so-called boiling water type. Boiling water nuclear reactors comprise a steam generating plant wherein reactor water coolant is circulated through a core of heat producing fissionable nuclear fuel to transfer thermal energy from the fuel to the coolant water and thereby produce steam. The steam is then used to drive turbines and other machinery employing steam, such as for electrical power generation.

BACKGROUND OF THE INVENTION

Due to the prodigious quantities of thermal energy produced by fissioning nuclear fuel, it is imperative to maintain the fuel core of commercial water cooled nuclear fission reactors submerged within heat transferring coolant water. The conveyance of heat out away from the energy producing fuel core by means of circulating coolant water is needed to preclude the possibility of hazardous conditions or reactor damage such as could occur with an overheating meltdown within the fuel core of the reactor plant.

Such a potentially destructive occurrence can result from a loss of coolant accident (LOCA) caused by an extensive breach of a major reactor coolant receptacle or conduit. To cope with this theoretical accidental event, commercial water cooled nuclear fission reactors are provided with large reservoirs of water available for supplying supplementary coolant water to the reactor vessel for cooling the fuel core and maintaining lower or normal operating temperatures. A variety of safety measures have been proposed or employed to activate and operate systems for supplying or injecting this supplementary coolant water as needed to the fuel core for replacing or supplementing any loss of the original coolant water due to some mishap.

A typical arrangement in commercial water cooled nuclear fission reactor plants for incorporating standby safety systems which feed or inject auxiliary coolant water to temper the fuel core temperatures utilize an apt gas, such as nitrogen, for a propellant to drive the supplementary liquid water or a boron solution from a source or reservoir through communicating conduits into the reactor vessel. Thus, auxiliary coolant water or an aqueous boron solution is maintained within a closed vessel or tank under sufficient gas pressure to drive the liquid contents into the reactor vessel through an appropriate arrangement of conduits upon a manually or automatically actuated signal responding to a malfunction within the reactor.

However, such systems are prone to leakage and loss of gas for propelling coolant water as well as prone to malfunctioning of the manual and/or mechanical or electronic means for actuation of the system.

Another means comprises gravity feed arrangements employing elevated vessels of auxiliary coolant water. However loss-of-coolant accidental events can sometimes result in overheating which in certain cases causes increased pressures above the already high pressures within the reactor pressure vessel. The occurrence of such elevated pressure conditions inhibits gravity feeding of coolant water into a highly pressurized reactor vessel.

SUMMARY OF THE INVENTION

This invention comprises an improved standby safety system for water cooled, nuclear fission reactor plants. The improvement of the invention comprises a totally passive delivery means for introducing a standby supply of auxiliary coolant water into the fuel core region of the nuclear reactor pressure vessel. Additionally this invention comprises a unique arrangement of auxiliary coolant water reservoirs housed within the reactor pressure vessel combined with means for providing inherently passive action or motivating force for supplying auxiliary coolant water to deal with a reactor emergency or malfunction.

OBJECTS OF THE INVENTION

It is a primary object of this invention to provide an improved coolant water standby safety supply system for nuclear fission reactor plants.

It is an additional object of this invention to provide a coolant water standby safety supply system for water cooled nuclear fission reactor plants having a passive delivery means.

It is a further object of this invention to provide a standby safety supply for water cooled nuclear fission reactor plants having an inherent passive gas propellant source and application system that enhances safe performance as well as economic benefits.

It is a still further object of this invention to provide a liquid standby safety supply system for water cooled nuclear fission reactor plants having an improved arrangement of coolant water delivery which is actuated passively upon occurrence of a malfunction.

It is also an object of this invention to provide improved multiple liquid standby safety supply for water cooled nuclear fission reactor plants providing for auxiliary application of coolant water to the fuel core by means of a passive system providing an inherent source of propellant gas during any period of core overheating due to a loss of coolant accident.

DETAILED DESCRIPTION OF THE INVENTION

Figure 1:
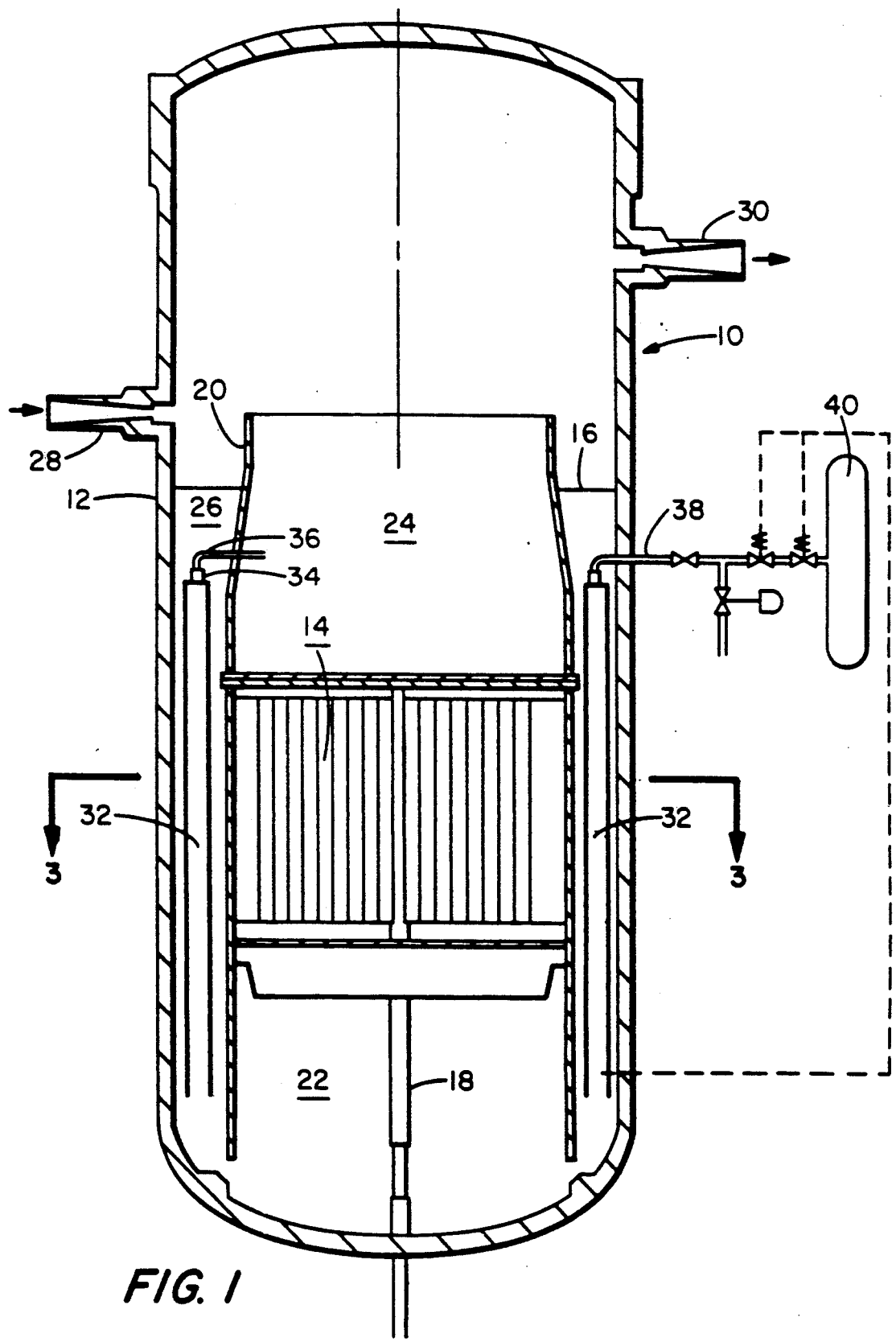
FIG. 1 of the drawing comprises a schematic illustration of a nuclear fission reactor in cross-section showing the standby safety auxiliary coolant water injection system of the invention.

Referring to FIG. 1 of the drawing, a water cooled nuclear fission reactor plant 10 includes a reactor pressure vessel 12, containing a core of fissionable fuel material 14, such as enriched uranium oxide pellets contained within sealed metal tubes grouped into conveniently sized bundles. During reactor power generation operations, the neutron incited fission reaction of the fuel material is controlled by neutron-absorbent control rods or blades positioned into appropriate amounts and patterns of control rod withdrawal to produce prodigious amounts of thermal energy. The core of fuel assemblies is positioned centrally in a lower region of the reactor pressure vessel 12 spaced inward therefrom and substantially submerged in coolant water 16 which circulates through the fuel core 14 to carry away heat and form steam for work, such as driving a turbine for generating electrical power. Control rods 18 containing a neutron absorbing material such boron, are reciprocally moveable into and out from the fuel core 14 to control or govern the rate of the neutron incited fission reaction of the fuel, or to terminate the reaction. This in turn regulates the quantities of heat produced by the fuel core 14 for generating steam to perform work.

Typically such nuclear reactor plants 10 are provided with an auxiliary cooling water system, including a supplementary cooling water reservoir containing a standby supply of supplementary water coolant.

Cooling water auxiliary systems heretofore were commonly activated and driven with a propellant gas under pressure, such as nitrogen, as a means for propelling supplementary water coolant from a reservoir tank into the reactor vessel 12. A propellant gas source for a supplementary coolant reservoir normally consisted of high pressure gas supply tank connected with the reservoir through fluid conduit. Such means are susceptible to leakage and in turn malfunction.

Figure 2:
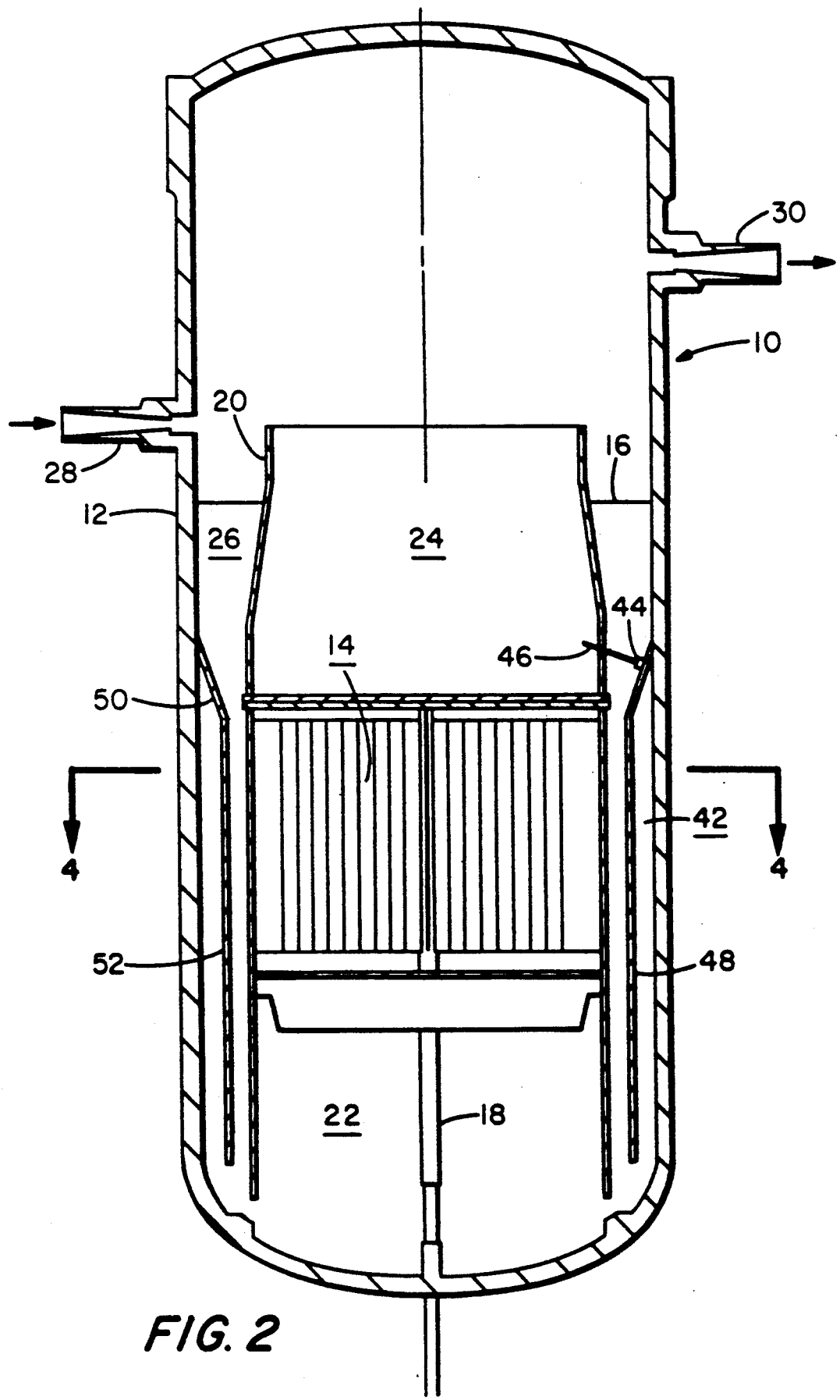
FIG. 2 of the drawing comprises a schematic illustration of a nuclear fission reactor in cross-section showing a variation of the standby safety auxiliary coolant water injection system of the invention.

The reactor pressure vessel 12 of the plant 10 contains a fuel core shroud 20 encircling the inward spaced fuel core 14 as shown in FIGS. 1 and 2. The fuel core shroud 20 extends a distance both above and below the surrounded fuel core 14 to form a fuel core lower plenum area 22 comprising the region within the shroud beneath the fuel core and a fuel core upper plenum area 24 comprising the region within the shroud above the fuel core. The fuel core shroud 20 is typically an open ended cylinder in configuration, and is of smaller diameter than the pressure vessel 12 being positioned inward away from the side wall of the reactor pressure vessel 12 to provide an annular area 26 between the outside wall of the fuel core shroud 20 and the inside wall of the reactor pressure vessel 12. The annular area 26 forms a downward flow path for the circulation of coolant water 16 through its cooling cycle comprising condensed coolant feedwater 16 supplied by the vessel inlet 28 along with reactor vessel recirculating liquid water coolant 16 flowing downward through the annular area 26. The coolant water 16 then continues down and around the lower edge of the fuel core shroud 20 and upon reversing flow direction, the coolant water 16 passes upward within the fuel core shroud 20. Thus the circulating coolant water 16 flows in sequence up through the core lower plenum area 22, the fuel core 14 and the core upper plenum area 24. On passing through the heat producing fuel core 14 the coolant water 16 absorbed heat therefrom converting a portion of the coolant water to steam. The steam admixed with the remaining liquid water coolant on passing through the core upper plenum area 24, and beyond, are substantially separated by apt means whereupon the steam exits from the pressure vessel 12 to perform work. The remaining liquid water coolant 16 again reverses its flow path above the top of the fuel core shroud 20 and passes down within the annular area 26 along with some returned feedwater usually originating as condensed steam and purified make up water usually originating from power station condensate water storage tanks or evaporators to endless repeat this cooling cycle.

This circulating coolant water system maintains the heat producing core of fissionable fuel submerged within the coolant water flowing thereover as a means of governing the reactor's temperature and in turn the reactor vessel pressure through continuous heat transfers from the fuel core to the circulating coolant water and the evaporation of a portion thereof into steam.

However, in the unlikely event of a significant breach of a coolant water containing component of the reactor, such as a main pipe, with a resultant reactor depressurization and with a resultant substantial loss of coolant water from about the heat producing fuel core uncovering same, and/or interrupting the circulation of the coolant water, the fuel core and associated components within the reactor pressure vessel soon overheat.

In accordance with this invention a standby supply of coolant water for more completely submerging the heat producing core of fissionable fuel of the reactor is provided for any instances involving inadvertent loss of coolant water. Coolant water of the standby supply in this invention is retained within the reactor pressure vessel, and the activation and the impelling or driving means are inherently passive responding to any overheating within the reactor pressure vessel.

Referring to the drawings, at least one elongated chamber 32 is provided within the annular area 26. Elongated chamber(s) 32 is provided with an open lower end, and a closed upper end having a small orifice bleed vent 34. Small orifice bleed vent 34 in the closed upper end of chamber 32 is preferably vented through a small diameter tube such as a capillary tube 36 passing through the shroud 20 into the core upper plenum area 24.

With the foregoing means and arrangement of this invention, coolant water 16 flowing through the reactor pressure vessel 12 during normal operating conditions fills the elongated chamber 32 through its open lower end replacing the initial gaseous contents as the gaseous contents are vented out therefrom over a prolonged period of time through bleed vent 34. Thereafter, upon the occurrence of a loss of coolant water 16 due to an accident or the like, the inevitable resultant depressurization of the hot reactor coolant will everywhere throughout the body of liquid comprising coolant water 16 produce steam formation in the form of small bubbles in a process well known as steam flashing. The flashing formation of steam within the coolant water contents of the water filled elongated chamber 32 will similarly occur because of the comparably hot conditions of this water. This inherently produced steam rising to the bleed vented closed top and rapidly expanding within the chamber 32 as the reactor depressurization transient proceeds will drive the remaining coolant water contents of the chamber 32 out through the open lower end into the pressure vessel 12 supplementing the leaking volume of coolant water 16 for submerging and cooling the heat producing fuel core. Thus, supplementary coolant water is supplied from a source within the reactor pressure vessel 12 and is applied by inherently passive means.

Figure 3:
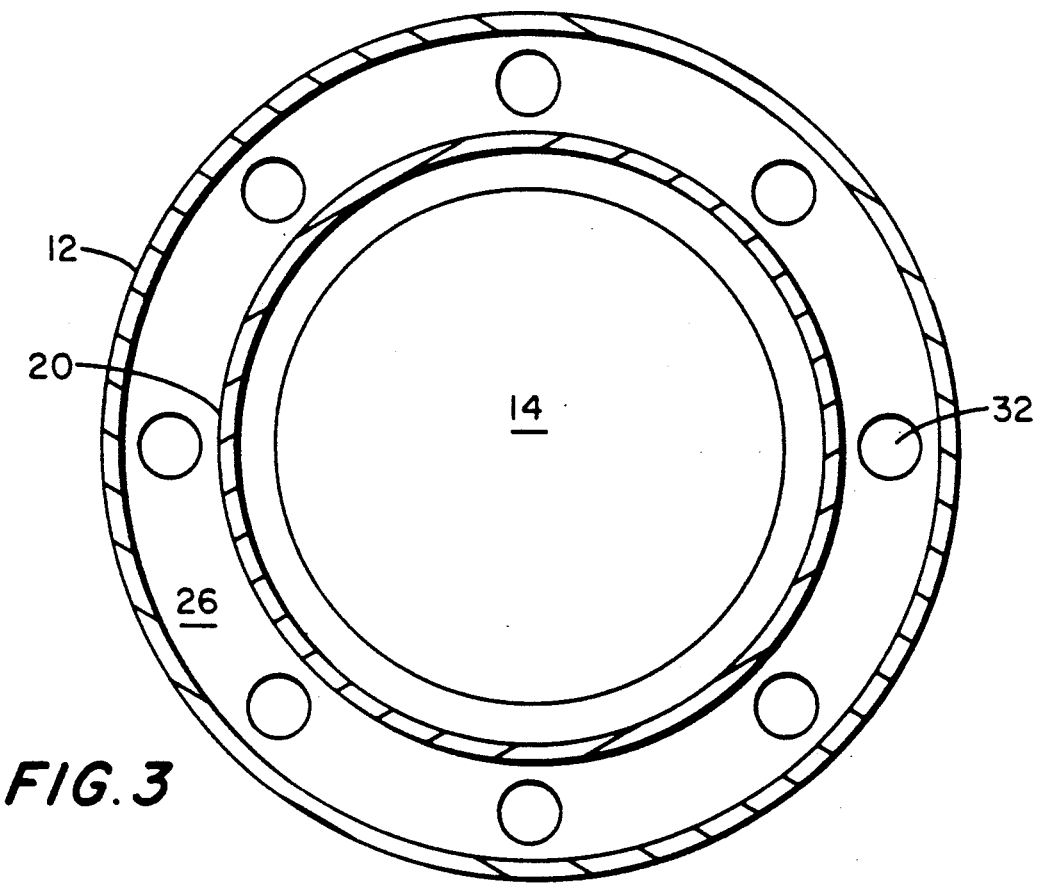
FIG. 3 of the drawing shows a cross section view of the nuclear fission reactor of FIG. 1 along lines 1—1.

Referring to FIGS. 1 and 3 of the drawings, a preferred embodiment of this invention comprises a plurality of spaced apart elongated chambers 32 arranged in an encircling configuration around and within the annular area 26 to provide for an enhanced supply of supplementary coolant water. The elongated chambers 32 desirably are of tubular-like construction of suitable length and diameter to reside in annular area 26 without effectively obstructing coolant water flow therethrough.

An alternative or additional measure of this invention of either replacing or modifying the bleed vent 34/capillary tube 36 means and/or the passive steam driving phenomenon, comprises providing a duct 38 communicating from the vent 34 in the closed top of chamber(s) 32 to a vent and source of auxiliary pressure external of the reactor pressure vessel 12. Namely, the duct 38 extends out from the reactor pressure vessel 12 and is in communication with a valve for venting gases from the chamber(s) 32, and/or with a source of fluid pressure 40 to either provide the driving force to expel supplementary coolant water from chamber(s) 32, or augment inherently produced steam in chamber(s) 32 in expelling the supplementary coolant water out into the reactor vessel.

Figure 4:
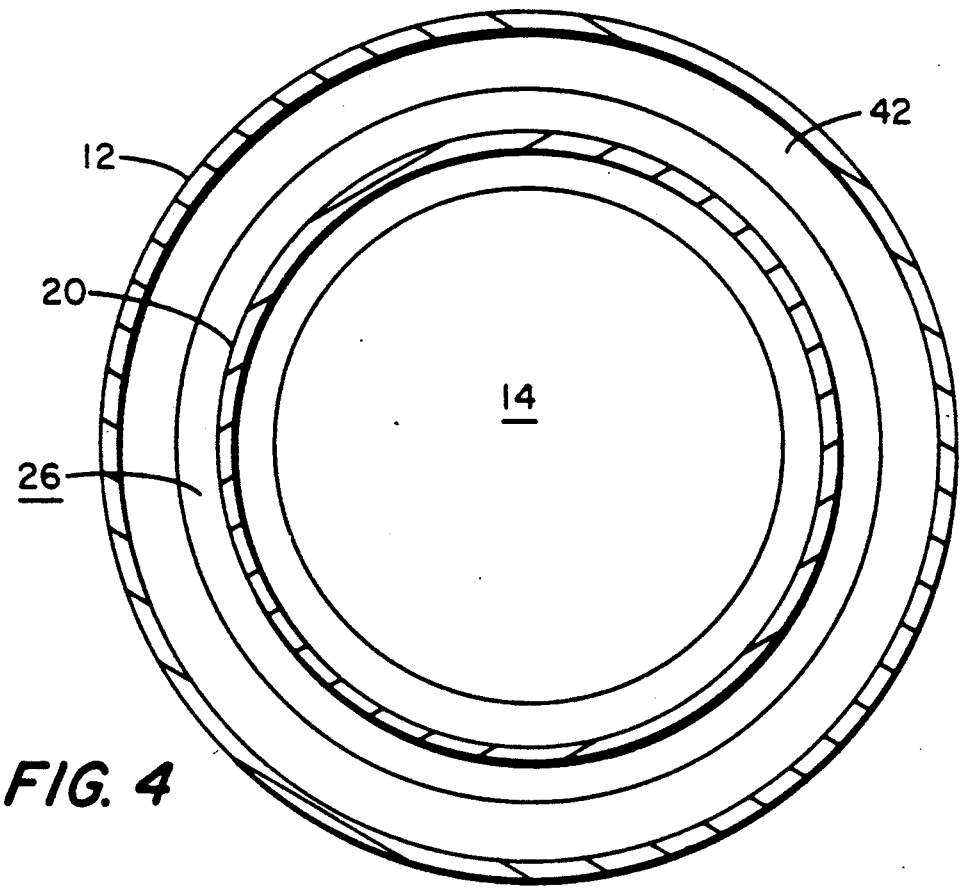
FIG. 4 of the drawing shows a cross-section view of the nuclear fission reactor of FIG. 2 along lines 2—2.

Another embodiment of this invention is illustrated in FIGS. 2 and 4 of the drawings. In this version of the invention a supplementary coolant water chamber 42 of annular configuration is provided. Chamber 42 induces an open lower end and closed upper end having at least one small orifice bleed vent 44 communicating with a capillary tube 46 for bleeding gases from the chamber. Alternatively annular chamber 42 can be provided with a duct 38 extending outside of the reactor pressure vessel 12 for venting and/or connecting to source of auxiliary gas pressure.

Annular chamber 42 extending around annular area 26 can be formed by providing an annular skirt 48 having a top wall section 50 extending generally inward from the inside of the reactor pressure vessel 12 into a limited portion of the annular area 26, with a side wall section 52 extending therefrom downward within annular area 26, generally concentric to the reactor pressure vessel 12 and the fuel core shroud 20. Thus, the outer portion of annular area 26 is closed off except at its bottom to provide a supplemental coolant water chamber 42 while the inner portion of annular area 26 remains open and available for the normal circulation of coolant water.

What is claimed is:

1. A boiling water nuclear fission reactor having a standby supply of coolant water for submerging the heat producing fissionable fuel core of the reactor during any periods of inadvertent loss of coolant accidents, consisting essentially of the combination of:

a nuclear reactor pressure vessel having an inlet for supplying circulating coolant feedwater, and an outlet for steam discharge therefrom;

a core of fissionable fuel for producing heat to generate steam from coolant water located centrally in a lower region of the reactor pressure vessel and spaced inward therefrom, said fuel core normally being submerged in circulating coolant water; an open ended cylindrical shroud encircling the fuel core and extending a distance both above and below the fuel core to provide a core upper plenum area above the fuel core and a core lower plenum area below the fuel core, said cylindrical shroud being spaced inward away from the reactor pressure vessel to provide an annular area for a coolant flow path between the inside of the pressure vessel and the outside of the open ended cylindrical core shroud whereby coolant feedwater supplied by the vessel inlet along with recirculating liquid water coolant can flow downward from the upper region of the reactor pressure vessel about the exterior of the fuel core surrounding shroud and then around the shroud bottom and back upward through the heat producing fuel core for submerging same and absorbing heat energy to cool the fuel core and generate steam for discharge from the vessel outlet to perform work; and at least one elongated chamber having an open lower end and closed upper end provided with a bleed vent for venting gaseous contents out from the chamber, positioned generally vertically within the annular area between the reactor pressure vessel and shroud surrounding the fuel core, whereby the chamber can fill from the circulating coolant water and contain liquid coolant water during normal reactor operation and upon the inadvertent occurrence of a reduced level of liquid water coolant for submerging the fuel core due to a loss of coolant accident resulting in a depressurization of the reactor, steam is flashed within the liquid contents in the chamber which forces the contained coolant water from the chamber into the reactor vessel about the fuel core to augment cooling of the same.

2. The boiling water nuclear reactor of claim 1, wherein a multiplicity of generally vertical elongated chambers are positioned in a spaced apart array around the annular area between the reactor pressure vessel and the shroud surrounding the fuel core.

3. The boiling water nuclear fission reactor of claim 1, where the generally vertical elongated chamber is tubular in configuration.

4. The boiling water nuclear fission reactor of claim 1, wherein the generally vertical elongated chamber is annular in configuration encircling around the shroud surrounding the fuel core within the annular area between the reactor pressure vessel and the shroud.

5. A boiling water nuclear fission reactor having a standby supply of coolant water for submerging the heat producing core of fissionable fuel of the reactor during any periods of inadvertent loss of coolant accidents, consisting essentially of the combination of: a nuclear reactor pressure vessel having an inlet for supplying circulating coolant feedwater into the reactor pressure vessel and to a fuel core therein and an outlet for steam discharge therefrom; a core of fissionable fuel for producing heat to generate steam from coolant water located centrally in a lower region of the reactor pressure vessel and spaced inward therefrom, said fuel core normally being submerged in circulating coolant water; an open ended cylindrical shroud encircling the fuel core and extending a distance both above and below the fuel core to provide a core upper plenum area above the fuel core and a corer lower plenum area below the fuel core, said cylindrical shroud being spaced inward away from the reactor pressure vessel to provide an annular area for a coolant flow path between the inside of the pressure vessel and the outside of the open ended cylindrical core shroud whereby coolant feedwater supplied by the vessel inlet along with recirculating liquid water coolant can flow downward from the upper region of the reactor pressure vessel about the exterior of the fuel core surrounding shroud and then around the shroud bottom and back upward through the heat producing fuel core for submerging same and absorbing heat energy to cool the fuel core and generate steam for discharge from the vessel outlet to perform work; and at least one elongated tubular chamber having an open lower end and closed upper end provided with a bleed vent for venting gaseous contents out from the tubular chamber, positioned generally vertically within the annular area between the reactor pressure vessel and shroud surrounding the fuel core and extending from above to below the position of the fuel core, whereby the chamber can fill and contain liquid water coolant during normal reactor operation and upon the inadvertent occurrence of a reduced level of liquid coolant water for submerging the fuel core due to a lose of coolant accident resulting in a depressurization of the reactor, steam thereby is flashed within the liquid contents in the tubular chamber which forces the contained coolant water from the open lower end of the tubular chamber out into the reactor vessel about the fuel core to augment cooling of the same.

6. The boiling water nuclear fission reactor of claim 5, wherein a multiplicity of generally vertical elongated tubular chambers are positioned in a spaced apart array around within the annular area between the reactor pressure vessel and the shroud surrounding the fuel core.

7. The boiling water nuclear fission reactor of claim 5, wherein the bleed vent comprises a capillary tube for the venting of any gases from the interior of the elongated tubular chamber.

8. The boiling water nuclear fission reactor of claim 5, wherein the bleed vent in the closed upper end of the elongated tubular chamber is in fluid communicated through a duct with the core upper plenum area whereby any gases from the interior of the elongated tubular chamber are vented therefrom out into the core upper plenum area.

9. The boiling water nuclear fission reactor of claim 5 wherein the bleed vent in the closed upper end of the elongated tubular chamber is in fluid communication through a duct with a source of fluid pressure external to the reactor pressure vessel for forcing contained coolant water from the open lower end of the tubular chamber out into the reactor vessel about the fuel core to augment cooling the same.

10. A boiling water nuclear fission reactor having a standby supply of coolant water for submerging the heat producing core of fissionable fuel of the reactor during any periods of inadvertent loss of coolant accidents, consisting essentially of the combination of:
a nuclear reactor pressure vessel having an inlet for supplying circulating coolant feedwater into the reactor pressure vessel and to a fuel core therein and an outlet for steam discharge therefrom;
a core fissionable fuel for producing heat to generate steam from coolant water located centrally in a low region of the reactor pressure vessel and spaced inward therefrom, said fuel core normally being submerge din circulating coolant water; an open ended cylindrical shroud encircling the fuel core and extending a distance both above and below the fuel core to provide a core upper plenum area above the fuel core and a core lower plenum area below the fuel core, said cylindrical shroud being spaced inward away from the reactor pressure vessel to provide an annular area for a coolant flow path between the inside of the pressure vessel and the outside of the open ended cylindrical core shroud whereby coolant feedwater supplied by the vessel inlet along with recirculating liquid water coolant can flow downward from the upper region of the reactor pressure vessel about the exterior of the fuel core surrounding shroud and then around the shroud bottom and back upward through the heat producing fuel core for submerging same and absorbing heat energy to cool the fuel core and generate steam for discharge from the vessel outlet to perform work; and a generally vertical elongated chamber of annular cross sectional configuration having an open lower end and closed upper end provided with a bleed vent for venting gaseous contents out from the annular chamber, positioned generally vertically within the annular area between the reactor pressure vessel and the shroud encircling around the shroud surrounding the fuel core and extending therein from above to below the position of the fuel core, whereby the chamber can fill and contain liquid coolant water during normal reactor operation and upon the inadvertent occurrence of a reduced level of liquid coolant water for submerging the fuel core due to a loss of coolant accident causing a depressurization of the reactor, steam is flashed within the liquid contents in the annular chamber forcing the contained coolant water from the chamber into the reactor vessel about the fuel core to augment cooling of the 11. The boiling water nuclear fission reactor of claim 10, wherein the generally vertical chamber of annular cross sectional configuration is adjoined with the reactor pressure vessel which provides a wall portion of the chamber.

12. The boiling water nuclear fission reactor of claim 10, wherein the bleed vent comprises a capillary tube for the venting of any gases from the interior of the annular chamber.

13. The boiling water nuclear fission reactor of claim 10, wherein the bleed vent in the closed upper end of the annular chamber is in fluid communication through a duct with the core upper plenum area whereby any gases from the interior of the annular chamber are vented therefrom out into the core upper plenum area.

14. The boiling water nuclear fission reactor of claim 10, wherein the bleed vent in the closed upper end of the annular chamber is in fluid communication through a duct with a source of fluid pressure external to the reactor pressure vessel for forcing contained coolant water from the open lower end of the annular chamber out into the reactor vessel about the fuel core to augment cooling of the same.

* * * * *